3,032,600
LIGHTWEIGHT ELECTRODE
Stanley W. Mayer, Canoga Park, Calif., assignor to North American Aviation, Inc.
Filed Jan. 4, 1960, Ser. No. 258
8 Claims. (Cl. 136—6)

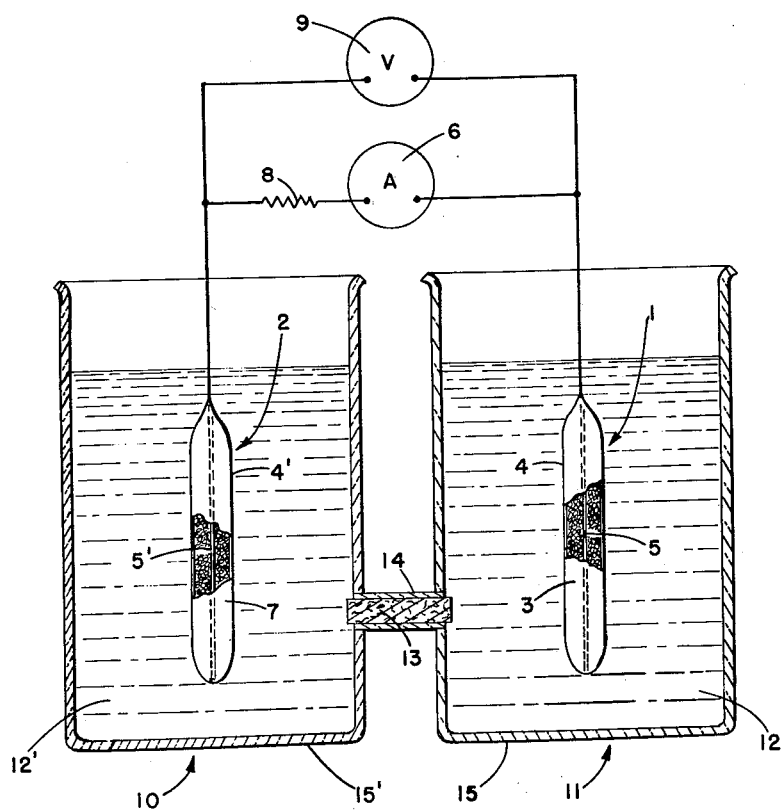

My invention relates to an improved lightweight cell, and more particularly to a lightweight, reversible electrode.

Batteries are devices from which chemical energy is converted into electrical energy by electrochemical processes occurring as current is withdrawn. Batteries are usually categorized as primary, and secondary or storage. The primary cells do not have practically reversible chemical reactions, that is, the cells cannot be recharged. The secondary or storage cells can undergo reversible reactions, and can be recharged by applying current to the electrodes in a reverse manner to discharge cycle.

A major factor limiting even wider use of storage batteries, such as the conventional lead, nickel-iron, and silver-zinc types, is their weight. If batteries were of lighter weight, and of greater output per unit weight, they would find considerably more widespread use, for instance in propulsion devices. A principal factor in the total weight of the lead storage cells now in widespread use is the weight of the electrodes. For example, although a total of 8.3 grams of Pb and $PbO_2$ is required to produce 1 ampere-hour (at 1.95 volts) the actual weight of the electrodes can be 60 grams (per ampere-hour, 5-hour discharge) which is 67% of the weight of the battery. Furthermore, the electrolyte is consumed in operation of the typical storage cell. For instance, the $H_2SO_4$ electrolyte in the lead cell is consumed in converting the Pb and $PbO_2$ electrodes to $PbSO_4$.

Accordingly, the principal object of my present invention is to provide an improved, lightweight cell.

Another prime object of my invention is to provide an improved, lightweight electrode for an electrical cell.

Another object is to provide an improved, lightweight battery cell using almost wholly effective electrodes.

Another object is to provide a storage cell having lightweight electrodes wherein the cell is rechargeable.

Yet another object is to provide such a storage battery in which the lightweight electrodes are dimensionally and chemically stable in an electrolyte.

A further object of my invention is to provide such a storage battery whose life expectancy, in terms of repeated discharging and recharging, is greater than that of the present common storage cells.

A still further object is to provide a storage battery wherein the electrolyte is not consumed during operation.

Other objects and advantages of my invention will become apparent from the following detailed description.

In accordance with my present invention, I have provided a new type of electrode material for batteries, both primary and storage. The electrode material is an organic ion exchange resin containing absorbed multi-valent ions. The absorbed ions are the active constituents, undergoing electron change reactions. The ions absorbed on the anode, which are in reduced form, donate electrons through an external circuit to the oxidized ions absorbed on the cathode.

The single drawing is a schematic representation of a cell using my electrode material.

The long life, high efficiency, and light weight results from the weight of electrode material per electrochemical equivalent being several times less than that of a conventional electrode, for instance ⅐ of that of lead battery electrodes. My ion exchange resin electrodes have further advantages as an electrode material: they are dimensionally stable so that they can form the electrodes of a storage battery; they are polymerized sufficiently to be very durable; and they are electrochemically reversible.

The ion exchange resins may be used in a number of different manners within the scope of my invention. For instance, the same resin may be used at both electrodes, with the oxidized form of an ion absorbed on one electrode and the reduced form of the same or different ion absorbed at the other electrode. Different resins may be used at each electrode with the same or different absorbed metal ions, and a resin electrode may be used as one electrode against a conventional electrode.

A typical cell reaction, using ion exchange resins having absorbed multi-valent ions, is represented by the following equations (showing only the active electron exchange reactions):

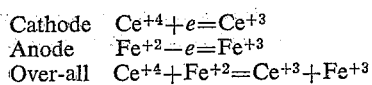

The ion exchange resins which may be used in my invention cover a broad range, and the use of any particular resin, resin class, or absorbed ions is not essential. Both cation and anion exchange resins may be used, and any of the commercially available resins are satisfactory. For example, the common cation exchange resins are synthetic organic polymers containing such active groups as sulfonic, carboxylic, phosphoric, phosphorous, and phenolic groups. The polymers themselves are commonly polystyrenes, polyacrylates, and polyphenol-formaldehyde resins. The resins are available under trade names such as Amberlite IR-1 and Dowex-50. Anion exchange resins, prepared by polymerization of an aromatic amine, or quaternary amine with formaldehyde or other condensing agents are also satisfactory for absorbing electrochemically suitable ions. For further information on ion exchange resins which may be used in my invention, a number of works are available, for instance R. Kunin, "Ion Exchange Resins," 2nd edition, Wiley, in particular pp. 89–96.

The ions which may be used are multi-valent metal ions which are strongly absorbed onto the resin in both oxidized and reduced forms. The actual electron exchange reactions are undergone by the absorbed ions. Examples of absorbed oxidant ions are $Ce^{+4}$, $Fe^{+3}$, $Co^{+3}$, $Co^{+4}$, $Pb^{+4}$, $Tl^{+3}$, $Ag^{+2}$, $Hg^{+2}$, $Mn^{+3}$, $Ni^{+3}$, $Ni^{+4}$, $Mg_2S_2O_8^{+2}$, $CrO_4^{-2}$, $Cr_2O_7^{-2}$, $S_2O_8^{-2}$, $Fe(CN)_6^{-3}$, $Ce(SO_4)_3^{-2}$, $ClO_3^-$, $MnO_4^-$, and $UO_2^{+2}$. Examples of absorbed reductant ions are $Sn^{+2}$, $Ti^{+2}$, $Cu^+$, $U^{+3}$, $Cr^{+2}$, $V^{+2}$, $Nb^{+3}$, $Ti^{+3}$, $S^{-2}$, $SO_3^{-2}$, $HPO_3^{-2}$, $S_2O_3^{-2}$, $Fe(CN)_6^{-4}$, $AsO_2^-$, $SnCl_3^-$, $HPO_2^{-2}$.

The oxidant and reductant ions may be absorbed on the resin by conventional methods known to the art, involving displacing the ion held on the resin as purchased, which is usually $H^+$ or $Na^+$. For example, $Fe^{+3}$ oxidant ion may be absorbed by passing an aqueous solution of $FeCl_3$ through a cation exchange resin bed.

When resins of the foregoing types are used as electrode materials, a useable current can be generated in a cell and the resins may be used without any additional modification. However, I find that inorganic electrical conductors may be mixed in with the resins to improve their conductivity. Among the additives which can be included in the resins to improve electrical conductivity are, by way only of example, graphite, silicon carbide, silver, platinum, nickel, chromium, and copper. The additives may range in concentration in the resin between 1–50 weight percent, for example only. It is preferred to use a low concentration within this range, when such additives are employed, to reduce electrode weight.

The choice of a suitable electrolyte for a cell employing my electrode is broad. Conventional aqueous acidic, basic and neutral salt solutions may be used, for instance $H_2SO_4$, HCl, NaOH, KCl, $K_2HPO_4$, $CaCl_2$, NaCl, and $NaH_2PO_4$. For other common electrolytes which may be employed see "Physical Chemistry of Electrolytic Solutions," Harned and Owens. The concentration of electrolyte should not be high enough to displace, for example, greater than 10% of the absorbed oxidant or reductant ions from the resin. Usually this will require a concentration of less than 1 molar. A typical electrolyte concentration is 0.1 molar. Since the electrolyte is not consumed, current variations from change in electrolyte concentration are not encountered. The change in the polymer electrode form results only from electron exchanges, and not from ion exchanges as in the lead battery. This favors an increase in cycle life of the battery.

The resins may be formed in a number of ways into self-supporting electrodes or membranes, thereby further reducing the total weight of a battery wherein they are employed. Among the ways known to the art in which this may be accomplished is by pressing. Pressing is conducted at a pressure sufficient to obtain coalescence, for example about 3,000–20,000 p.s.i. at ambient temperature.

Conventional depolarizer agents may also be optionally used in my cells, for instance ferrous ammonium sulfate and potassium iodide. This may serve to increase the current drawn for short periods, but the use of such depolarizers is not essential.

The following examples are offered to illustrate my invention in greater detail:

Example I

The cell employed is shown in the drawing. The cathode 1 and anode 2 contain sulfonated polystyrene resins, 500 grams of each. 124 grams of $Ce^{+4}$ oxidant ions are absorbed on the resin by passing an aqueous solution of 0.3 N $Ce(SO_4)_2$ through 510 grams of the resin, until 124 grams are absorbed. 217 grams of $Cr^{+2}$ are absorbed on the anode by passing an aqueous solution of 0.11 N $CrCl_2$ through 514 grams of the resin, until 217 grams are absorbed.

500 grams of the ceric form resin are used as the cathode material with 0.06 N $H_2SO_4$ to form a paste 3. The paste 3 is put in a polyethylene cathode bag 4 which has pores punched in it. For experimental purposes, a thin platinum wire 5 is put in the bag to conduct the current from the polymeric cathode material. The platinum sheet is in turn wired to the positive post of a multi-range ammeter 6.

The chromous form resin 7 anode is contained in the manner of the cathode in polyethylene anode bag 4' containing a platinum wire 5'. The anode 2 is connected through a 10 ohm resistor 8 in series to the negative post of the ammeter. A voltmeter 9 is put across the cell. The anode and cathode are immersed in separate half cells 10 and 11 with 0.06 N sulfuric acid as the catholyte 12 and anolyte 12'. The catholyte and anolyte are separated by a one-inch long plug of filter paper 13 contained in a glass tube 14 connecting 1000 cc. glass beakers 15 and 15' containing catholyte 12 and anolyte 12'. The battery action is started by immersing cathode 1 into the catholyte. A current of 8.6 amperes is obtained 2 minutes and 50 minutes after the battery action is started.

Example II

The same as Example I, except that the cathode in this run is a sulfonated phenolic polymer in the ferric form. $Fe^{+3}$ ions are absorbed onto the resin by passing an aqueous solution of 0.2 M $FeCl_3$ through 100 grams of the resin, until 8 grams of $Fe^{+3}$ are absorbed on the resin. The anode comprises the same resin with 12 grams of $Sn^{+2}$ absorbed on the resin by passing 0.2 M $SnCl_2$ through 100 grams of the resin. The catholyte and anolyte is 0.11 N HCl. The following measurements are obtained: one hour, 3.1 ampere. The cell is then recharged by reversing electrodes and passing a current of about 4 amperes at 1.75 for 1.3 hours.

Example III

The same as Example I, except that phosphonated phenolic resins are used. The oxidant ion absorbed on the cathode is $Mn^{+3}$ and the reductant ion on the anode is $Cu^+$. The electrolyte in each half cell is 0.07 N NaCl +0.01 N acetic acid. The following measurements are obtained: one hour, 1.7 ampere. The cell is subsequently recharged by reversing electrodes and passing a current of 125 ma. and 0.8 v. for 24 hours.

Example IV

The ion exchange resin for both the cathode and anode is a quaternary amine on polystyrene. The absorbed oxidant ion is $Cr_2O_7^{-2}$ and the reductant ion is $$Fe(CN)_6^{-4}$$

5 grams of Fe are absorbed on 100 grams of the cathode resin and 10 grams of $V^{+2}$ are absorbed on 100 grams of the anode resin. The electrolyte in both half cells is 0.05 M $NaS_2O_4$ in 0.01 M $H_2SO_4$. The measurements obtained are: one hour, 2.6 ampere. The cell is recharged after discharge by passing a current of 10 amperes and 2 v. through the cell for 2.4 hours with polarity reversed.

Example V

The same as Example I except that the cathode is compressed into a self-supporting electrode by applying a pressure of about 8,000 p.s.i. The anode is copper immersed in a copper sulfate anolyte. This is useful for testing because its voltage remains steady as current is withdrawn from the battery. The following measurements are obtained: 0.9 ampere at 4 hours after beginning battery action. After discharge the cell is recharged by passing a current of 1.5 amperes and 0.9 v. through the cell for six hours.

The foregoing examples are illustrative rather than restrictive of my invention. My invention should be understood to be limited only as indicated in the appended claims.

I claim:

1. In an electrochemical storage cell, an organic ion exchange resin cathode having as its active electron exchange substituent absorbed multivalent inorganic ions in an oxidized form, and an organic ion exchange resin anode having as its active electron exchange substituent absorbed multivalent inorganic ions in a reduced form.

2. The cell of claim 1, wherein said cathode and said anode have absorbed the same ion species, in oxidized and reduced states, respectively.

3. In an electrochemical battery storage cell, an organic ion exchange resin cathode having as its active electron receiver substituent absorbed multivalent inorganic ions in an oxidized form, an organic ion exchange resin anode having as its active electron donor substituent absorbed multivalent inorganic ions in reduced form, said cathode and said anode being electrically coupled, whereby electrons are transferred from said anode to said cathode.

4. The battery cell of claim 3, wherein an aqueous electrolyte is disposed in said cell.

5. A pair of electrodes for an electrochemical cell, each electrode comprising an organic ion exchange polymer, one of said electrodes having absorbed thereon a multivalent inorganic ion in oxidized form, and the other electrode having absorbed thereon a multivalent inorganic ion in reduced form, and means for electrically coupling said electrodes.

6. An electrochemical cell comprising a container, a pair of spaced electrodes disposed in said container, said electrodes being electrically coupled, said electrodes comprising organic ion exchange resins, one of said electrodes having as its active electron exchange constituent absorbed multivalent inorganic ions in an oxidized form, the other electrode having as its active electron exchange constituent absorbed multivalent inorganic ions in reduced form, and an electrolyte disposed in said container.

7. The cell of claim 6 wherein said electrodes are selected from the class of cation exchange resins consisting of polystyrenes, polyacrylates, and phenolformaldehyde resins having active groups selected from the class consisting of sulfonic, carboxylic, phosphoric, phosphorous, and phenolic groups; the absorbed inorganic ions in oxidized form are selected from the class consisting of $Ce^{+4}$, $Fe^{+3}$, $Co^{+3}$, $Co^{+4}$, $Pb^{+4}$, $Tl^{+3}$, $Ag^{+2}$, $Hg^{+2}$, $Mn^{+3}$, $Ni^{+3}$ $Ni^{+4}$, and $Mg_2S_2O_8^{+2}$; the absorbed multivalent reductant ions are selected from the class consisting of $Sn^{+2}$, $Ti^{+2}$, $Cu^+$, $U^{+3}$, $Cr^{+3}$, $V^{+2}$, $Nb^{+3}$, and $Ti^{+3}$; and wherein the electrolyte is selected from the class consisting of aqueous solutions of $H_2SO_4$, $CaCl_2$, HCl, NaOH, KCl, $K_2HPO_4$, NaCl, and $NaH_2PO_4$.

8. The cell of claim 6 wherein said electrodes are selected from the class of cation exchange resins consisting of polystyrenes, polyacrylates, and phenol formaldehyde resins having active groups selected from the class consisting of sulfonic, carboxylic, phosphoric, phosphorous, and phenolic groups, the absorbed inorganic ions in oxidized form are selected from the class consisting of $Ce^{+4}$, $Fe^{+3}$, $Co^{+3}$, $Co^{+4}$, $Pb^{+4}$, $Tl^{+3}$, $Ag^{+2}$, $Hg^{+2}$, $Mn^{+3}$, $Ni^{+3}$, $Ni^{+4}$, and $Mg_2S_2O_8^{+2}$; and the absorbed multivalent reductant ions are selected from the class consisting of $Sn^{+2}$, $Ti^{+2}$, $Cu^+$, $U^{+3}$, $Cr^{+2}$, $V^{+2}$, $Nb^{+3}$, $Ti^{+3}$.

References Cited in the file of this patent

UNITED STATES PATENTS

| | | |
|---|---|---|
| 2,694,742 | Harding | Nov. 16, 1954 |
| 2,786,088 | Robinson | Mar. 19, 1957 |
| 2,831,045 | Harding | Apr. 15, 1958 |

OTHER REFERENCES

Status Report on Fuel Cells, PB151 1804, U.S. Dept. of Commerce of Tech. Services, June 1959, page 61.